United States Patent [19]
Höllwarth

[11] 4,408,772
[45] Oct. 11, 1983

[54] SAILING VEHICLE

[76] Inventor: Armin Höllwarth, Waldstr. 25, 6108 Darmstadt-Weiterstadt, Fed. Rep. of Germany

[21] Appl. No.: 216,926

[22] Filed: Dec. 15, 1980

[30] Foreign Application Priority Data

Dec. 22, 1979 [DE] Fed. Rep. of Germany ....... 2951995

[51] Int. Cl.$^3$ .............................................. B62B 3/00
[52] U.S. Cl. ......................................... 280/1; 114/39; 114/43; 114/61; 114/144 R; 114/204; 114/218; 114/354; 114/361; 280/87.1; 280/213; 280/265
[58] Field of Search ..................... 114/39, 43, 102, 61, 114/218, 204, 144 R, 352, 354, 361; 280/87.1, 265, 1, 213, 810; 180/202

[56] References Cited

U.S. PATENT DOCUMENTS

| | | | |
|---|---|---|---|
| 99,166 | 1/1870 | Crandall | 280/265 |
| 1,625,579 | 4/1927 | Walters | 114/39 |
| 2,238,464 | 4/1941 | Fletcher | 114/39 |
| 3,475,772 | 11/1969 | Lokken | 9/1.5 |
| 3,593,684 | 7/1971 | Cogliano | 114/61 |
| 3,760,439 | 9/1973 | Swenson, Sr. | 114/61 |
| 4,241,684 | 12/1980 | Davis | 114/144 R |
| 4,294,184 | 10/1981 | Heinrich | 114/144 R |

Primary Examiner—Sherman D. Basinger
Attorney, Agent, or Firm—Michael, Best & Friedrich

[57] ABSTRACT

Disclosed herein is a sailing vehicle with a collapsible frame comprising two longitudinal supports, a plurality of identically constructed transverse struts detachably connected to the longitudinal supports, at least one sail mast, at least one seat, two rear moving elements, and one forward moving element, the latter being steerable via a steering suspension, and a cross arm which is detachably connected to the rear end of the longitudinal supports. The mast, the seat, the forward moving element, and the steering suspension are supported by separate ones of the transverse struts and at least the transverse strut supporting the seat is connected to the longitudinal supports for adjustment lengthwise thereof.

9 Claims, 10 Drawing Figures

SAILING VEHICLE

The invention concerns a sailing vehicle with a collapsible frame consisting of several supports and struts and having at least one sail mast, one seat, two rear moving elements and one forward moving element, the latter being steerable via a steering suspension.

As early as the 16th century people built vehicles which were equipped with sails. Since 1945 so-called beach sailers have been built at the beaches of the European Atlantic and North Sea coast. These vehicles weigh up to 400 kg and have a sail size to about 15 m². They are generally constructed as individual items. The individual construction components are relatively heavy and unwieldy, and their assembly normally takes several hours.

If a time-consuming assembly is to be avoided, voluminous single-unit frames have to be used, for instance plastic frames, which, however, have other disadvantages, in particular difficult stowing and transportation (see DE-OS No. 27 14 197).

In the basic construction of the frame a triangular shape has prevailed, which is logical for a steerable front wheel and two rear wheels. A triangular frame consisting of several supports and struts may be lightweight, but is not suited very well for a construction of as many identical parts as possible, which is desirable for economical manufacturing. In addition, with triangular main supports it is difficult to adjust the seat and/or steering mechanism to the body size of the driver.

It is the purpose of the invention to create a vehicle of the above-mentioned type which can be made of many identical parts in a simple manufacturing process, which can be quickly disassembled into a small packing unit and just as quickly be re-assembled, and which permits numerous varying adjustments of the individual components.

The invention meets the above purpose in that the frame consists of two longitudinal supports, which are collapsible or hinged at their center section, and of one crossarm, which is detachably connected to the rear end of the longitudinal supports, the two longitudinal supports being made into one unit by means of two traverse struts, and the mast, the seat, the forward moving element, and the steering suspension being supported at the transverse struts.

As a result of the suggested construction of a frame consisting of parallel longitudinal supports, all of the traverse struts can be essentially designed alike, and for the most part even completely identical, since they may have different, but nonetheless supporting functions. Furthermore, the parallel design of the longitudinal supports permits the practically limitless adjustment in the longitudinal direction of the longitudinal supports supporting various individual components. Finally, this type of frame construction offers the great advantage that a single cross division at the center produces two largely identical sub-assemblies which, placed on top of one another and connected with the disassembled individual components, constitute a packing unit which is so small that it can be effortlessly transported in or on top of a passenger car and also easily be stored at home.

The new sailing vehicle can be equipped with various moving elements, such as wheels, floating bodies and skids.

The preferred version of the invention includes, in addition to the above-mentioned supports and traverse struts, divisible diagonal struts between the mast and the outer ends of the crossarm. Preferably, all components which are detached when the vehicle is disassembled are connected to one another by means of secured plug-in connections.

If the suggested sailing vehicle is constructed with light metal and plastic, its weight is only about 25 kg. This low weight permits sailing at wind velocities from two m/sec on. It offers the additional advantage that the vehicle can be easily pushed or pulled. The latter purpose is also served by traverse struts at the front and rear of the frame, which are constructed as handles. When collapsed, the forward frame section and the front wheel located on it can be detachably connected with the rear section; it can then be pushed in the manner of a wheelbarrow by means of the handle at the rear section.

In the following, a construction example of the invention is being explained in greater detail by means of the drawing. The figures show.

Figure 1:
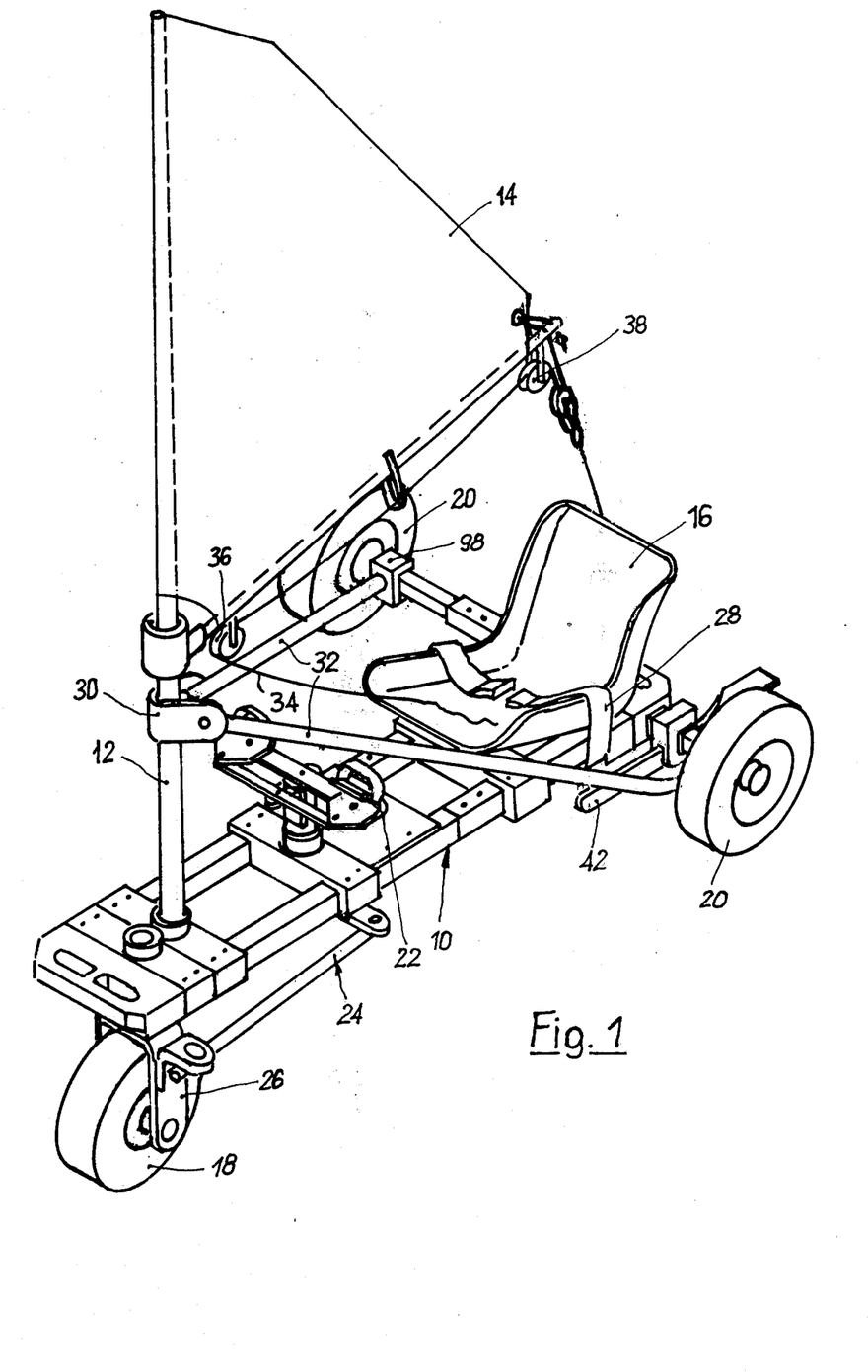
FIG. 1—a perspective view of a sailing vehicle ready for operation.

The sailing vehicle shown in FIG. 1 consists of a frame, which in toto is designated as 10, and which carries a sail mast 12 with sail 14 and a driver's seat 16. As is customary, the vehicle has three wheels, i.e. one steerable front wheel 18 and two nonsteerably supported rear wheels 20. The foot-operated steering pedals 22 are located at the frame 10 in front of the seat 16. From the pedals, the steering movements are transferred via a steering suspension 24 to a front wheel fork 26, which is located pivotable around a vertical axis at the frame and which guides the front wheel.

The sail 14 is located so high at the mast 12 that it moves above the head of the driver, who can wear safety belts 28 while driving. Directly below the sail is located at the mast 12 a mounting support 30, which is permanently attached to the mast, and to which the hinged two diagonal struts 32 by means of joints; the rear end of each strut is detachably connected with the frame 10 next to the rear wheels 20. Each diagonal strut 32 is sectionalized at its center area and detachably connected by means of plug-in connections (not shown) so that, when the vehicle is disassembled, the rear sections of the diagonal struts can be detached from the frame, as well as from the front sections of the diagonal struts, which are hinged to the mast; these sections can be stowed as relatively small components. For the same reason the mast 12 is preferably constructed of two detachably connected sections.

Figures 4, 5:
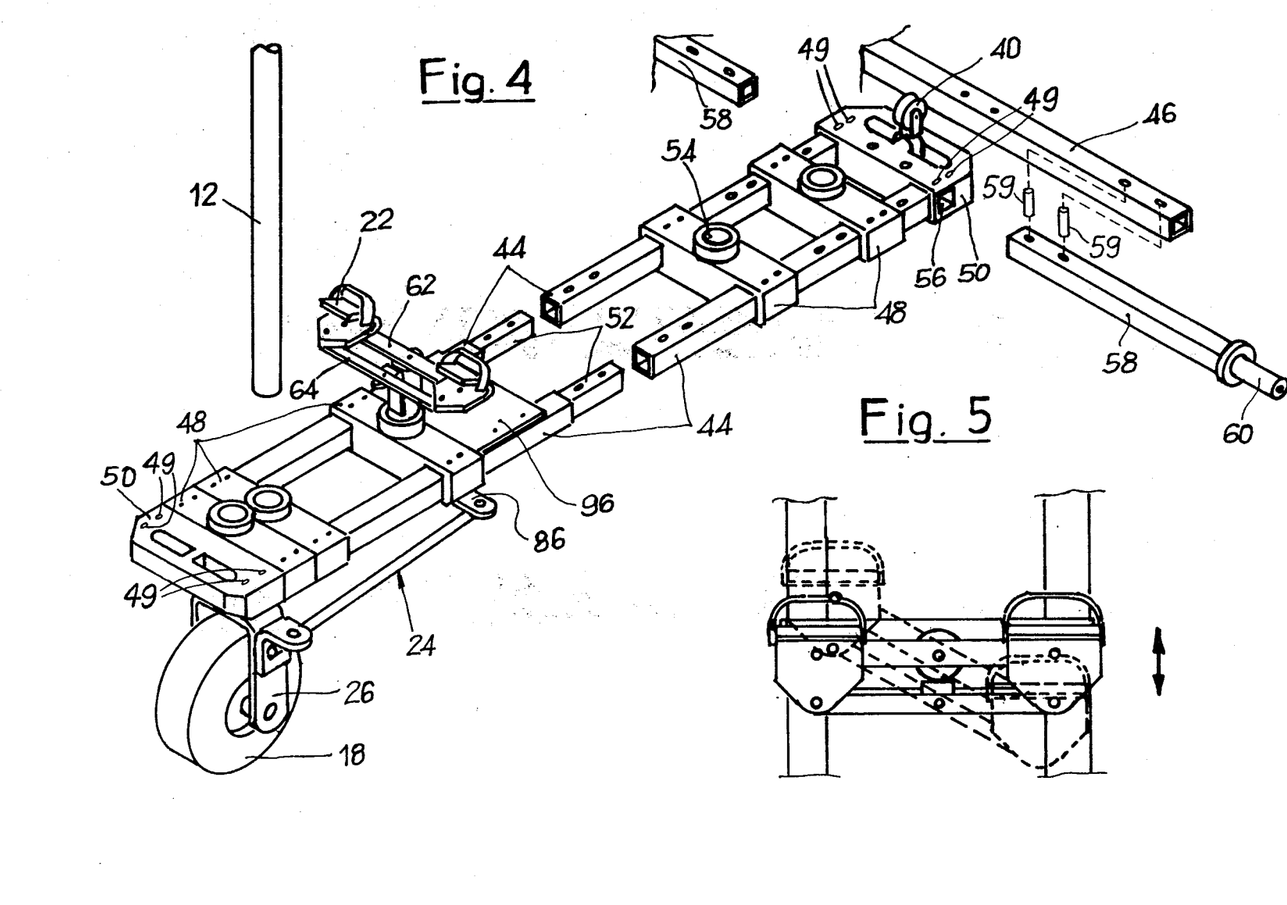
FIG. 4—an extended perspective view of the main components of the frame of the sailing vehicle according to FIG. 1.
FIG. 5—a detailed plan view of the steering pedals of the vehicle according to FIG. 1.

The sail guide is the customary hand-held rope 34, which runs over rollers 36, 38 at the sail beam and over one or several rollers 40 attached to the frame behind the seat (see FIG. 4). The equipment of the construction example includes a manual brake 42, which in the simplest instance is a lever pivoted at the frame; its flat rear section, for example, is pushed against the ground for braking purposes.

Reference is made to the special construction of the frame 10 of the new vehicle in FIG. 4, in connection with FIG. 1. It consists of two longitudinal supports 44 and one rear crossarm 46, which are connected with one another by several traverse struts 48, 50. The longitudinal supports 44 are divided at their center section, and their two halves are detachably connected by means of pins. In FIG. 4 the sections are shown in their separated condition. If, as in the example, hollow sections, f.i. of aluminum, are used for the longitudinal supports 44, the front and rear half of a longitudinal support can be connected by means of a connection 52, which is permanently attached in one support half and which, after being plugged into the other support half, is secured by pins. This is preferably done by means of two pins, which are located next to each other in the longitudinal direction of the frame, and which are connected with each other at one end by a bridge serving as a handle, and which are simultaneously inserted into their holes in the support sections.

The suggested construction offers the possibility of needing only two different traverse struts 48 and 50. The traverse struts 50 are located at the front and rear end of the longitudinal supports 44 and are connected thereto by pins 49; they form a handle and are equipped with parallel lugs (not shown), which fit into the longitudinal supports 44. After inserting these lugs into the longitudinal supports 44 at the rear traverse struts, these components are permanently attached to each other by pins or rivets. These connections do not have to be loosened when the user disassembles the vehicle for transportation purposes.

The other five traverse struts 48 shown in FIG. 4 have two through-bores fitting the outer profile of the longitudinal support sections, so that they can be pushed onto the longitudinal support sections from the center of these sections; in addition, these struts have one each central vertical bore 54. The components supported by the frame 10 are attached in the bore 54. Thus, the extreme forward traverse strut supports the pivot bearing of the front wheel fork 26, and the next traverse strut 48 supports the mast 12. The next traverse strut, which is also part of the forward frame section, includes the pivot bearing for the steering pedals. The two traverse struts of the rear frame section support the seat 16 by means of rods or pipes, which are attached to the seat and fit into the bores 54. The two extreme forward traverse struts 48 do not normally have to be adjusted during operation; for this reason, these struts, as well as the traverse struts 50, can be permanently attached to the longitudinal supports 44. However, the traverse struts 48 which support the seat 16 and the steering pedals 22 should be easily adjustable to varying driver body sizes. For this purpose, the longitudinal supports 44 can be constructed with numerous pin bores, so that the traverse struts 48, which are also supplied with pin bores, can be attached at any bores of the longitudinal supports by means of pins. Here, too, two adjacently located pins can be connected to one another by a bridge which is designed as a handle. Of course, an alternative to this type of traverse strut attachment would be to provide an infinite adjustment and clamping of the traverse struts 48 at the longitudinal supports 44. It is understood that, when the traverse strut 48 supporting the steering pedals 22 is adjusted, the steering linkage itself or relative to the front wheel fork 26 must be adjustable, too.

The traverse struts 48 and/or 50 can be of metal or plastic; they can be constructed as solid or hollow bodies. The central bore 54 receives the pivot bearings, as far as necessary for the components that are to be supported. The axial thrusts which exist with respect to the longitudinal axes of the bores 54 can be absorbed upward and/or downward by the collars which surround the bores 54 and protrude past the traverse struts 48.

The traverse strut 46 is inserted in a cross hole 56 in the rear traverse strut, which cross hole fits the outer cross section of the traverse strut 46. The traverse strut located at the front end (50) could also be provided with such a cross hole 56. However, since it not needed there, it can be kept closed. The attachment of the traverse strut 46 in the rear traverse strut 50 is again accomplished by means of detachable pins. In the construction example shown, the profile forming the traverse strut 46 does not reach as far as the rear wheels 20, but is connected at both sides with end pieces 58, which support the rear axles 60. Preferably, these end pieces 58 have an outer cross section that fits into the hollow profile of the traverse strut 46, so that they can be inserted into the traverse strut 46 and fastened by means of pins 59. The rear wheels 20 are pushed onto the wheel axles 60; in the example, they are held in place by a middle screw. Naturally, other types of wheel attachments are possible.

The above-described construction permits the adjustment of the wheel base of the rear wheels. For this purpose, one can either replace the end pieces 58 with shorter or longer end pieces, or one can provide relatively long end pieces 58 to begin with, which are pulled more or less far out of the traverse strut 46, as desired, and attached in the desired position by detachable pins and numerous pin bores.

Figure 6:
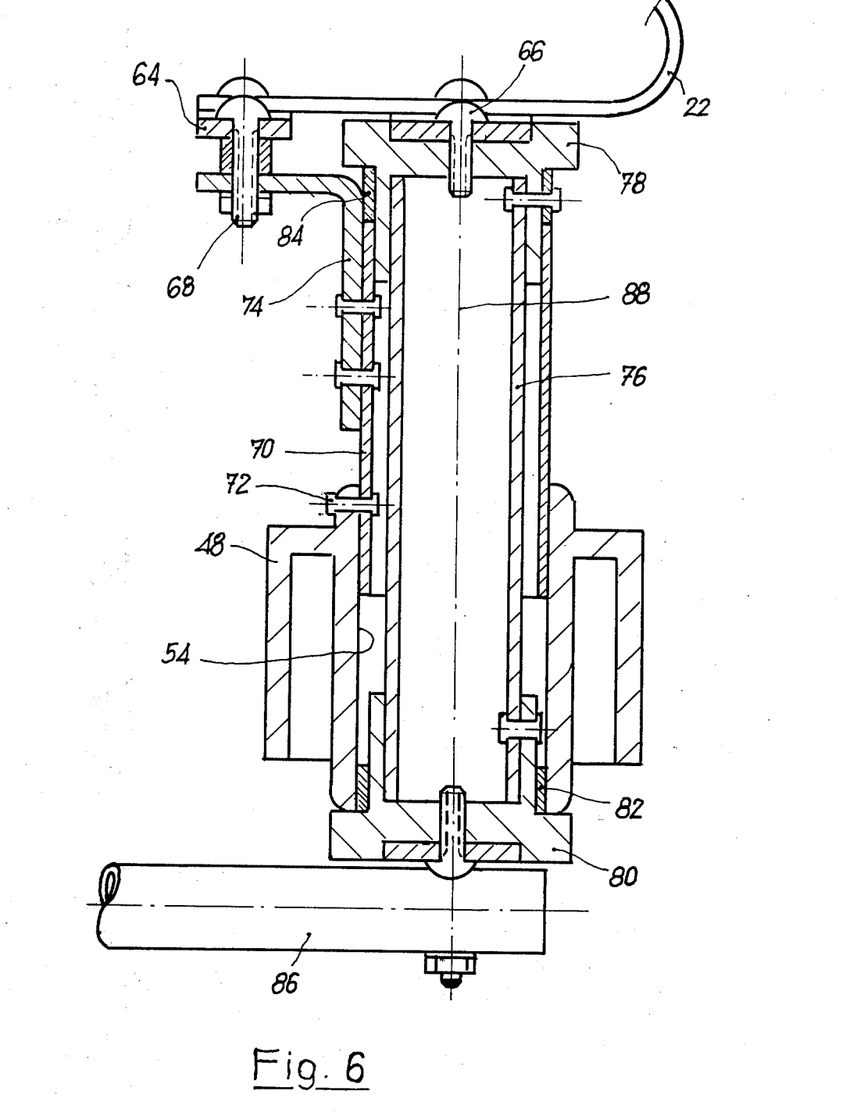
FIG. 6—a vertical cut through the steering pedal supports according to FIG. 5.

The steering pedals 22 are supported in such a way that they are parallel in any position. FIG. 6 shows how this can be accomplished with only one bearing hole 54.

The two steering pedals, which can consist, for example, of curved sheet metal and foot straps, are pivoted on two parallelogram controls 62, 64. Each of the two parallel controls 62, 64 is pivotable around a fixed axis of rotation, which is determined according to FIG. 6 by a screw 66 for control 62 and by a screw 68 for control 64. The point of support for the control 64 is placed at the traverse strut 48 by riveting a pipe 70 at 72 to the upper collar surrounding the bore 54; an angle 74 is riveted to the pipe 70, and the strut 74 is pivoted at this angle 74.

While the pipe 70 is attached torsion-proof with respect to the bore 54, an additional pipe 76 runs through the bore 54, in which it is pivotably supported. The pipe 76 has at its upper and lower end one ea. cap, for example of plastic, which is permanently attached to the pipe (cap 78, 80). The lower cap 80 is directly located in the bore 54 by means of a sliding sleeve 82, while the upper cap 78, to which the control is permanently attached (62), can rotate in the pipe 70. By connecting the upper cap 78 with a sliding sleeve 84, which is supported on the pipe 70, which is permanently attached to the traverse strut 48, the total bearing assembly is held axially.

Just as the control 66 is permanently connected with the inner pipe 76 via the upper cap 78, a non-turning connection exists via the lower cap 80 between the pipe 76 and a rod 86, which is part of the steering suspension 24. Consequently, when the control 62 is turned by means of the steering pedal 22 around the center axis of the bearing assembly (axis 88), the rod 86 deviates to the same degree around the same axis 88 and takes along the front wheel fork 26 and the front wheel 18 via the steering suspension 24.

From the above description of the new sailing vehicle arises the essential advantage of its construction of only few different components. Preferably, the longitudinal supports and the crossarm consist of the same hollow profile, which, for example, can also have a round, hexagonal or other suitable cross-section; if the traverse struts 48, 50 are to be manufactured as injection moldings, only two different shapes are needed. An additional uniformity results for the components supported by the traverse struts 48, since the bores 54, and consequently the bearings or pipes placed in them, have the same diameter. Along with this economic advantage in manufacture goes the additional advantage of easy adjustment of the wheel base and of the various parts supported by the traverse struts 48. Both advantages result from the suggested shape of the basic frame, consisting of two parallel longitudinal supports 44 and one rear support (crossarm) 46. This construction finally offers the additional, decisive advantage that the vehicle can be disassembled into easily transportable and storable units, and reassembled, with a few simple manipulations in a fraction of the time heretofore needed for this operation. During this operation, the complete front section of the frame with front wheel and steering remains intact; only the sail mast 12 has to be pulled out of the bore 54 which supports it. The assembly consisting of the front section of the frame contains numerous components which don't have to be disassembled and reassembled for every transport operation, yet it is small enough for easy stowing in a passenger car. As is evident in FIG. 4, in conjunction with FIG. 2, the front section of the frame can be used like a push cart when the vehicle has to be transported manually. For this purpose, as well as for visual and aesthetic reasons, it is also advantageous that the steering suspension 24 is located on the lower side of the frame, where it remains practically unseen and is not in the way when other parts of the vehicle are loaded on the front frame section as on a wheelbarrow.

Figure 2:
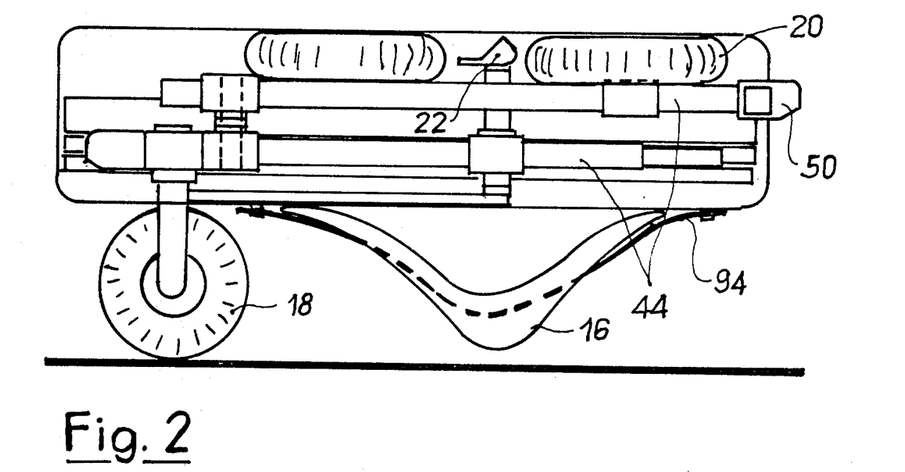
FIG. 2—the sailing vehicle according to FIG. 1 in collapsed condition as a simplified lateral view.
Figure 3:
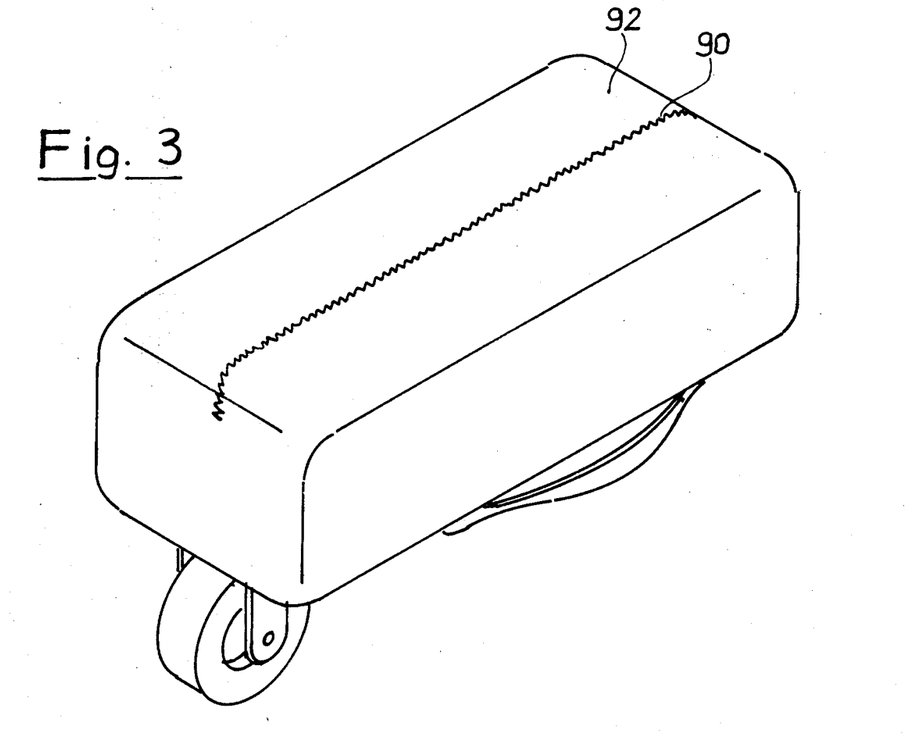
FIG. 3—a perspective view of the collapsed sailing vehicle according to FIG. 2.

A preferred packing method is shown in FIGS. 2 and 3. Here, a piece of pipe located in the bore 54 of the second-to-last traverse strut 48, which normally constitutes a plug-in connection with a pipe section attached to the seat 16, is inserted into the bore of the traverse strut 48 which is meant to receive the mast 12. As shown in FIG. 2, this results in a connection between the front section of the frame, serving as a wheelbarrow, and the rear frame section, which is lying upside down. The unit, formed in this manner from the two frame sections, can be conveniently grasped and pushed by the end traverse strut 50, which is designed as a handle. The loosening of the plug-in connection between the front and rear frame sections during transport is already assured by the steering controls 62, 64, which protrude beyond the rear frame section, and by a cover 92, which envelops both frame sections, but it can be secured additionally by tying a rope or using other suitable means of holding the two frame section together. The collapsible mast 12, the collapsible diagonal struts 32, the crossbar 46 and the components and rear wheel connected to the crossbar 46, are also placed inside the cover 92. The seat 16, for example, can be secured with the straps 94 at the underside of the cover 92.

As an alternative, the cover could also be permanently attached to the front portion of the frame, so that it becomes a protective cover for the driver's legs during operation. Independent of this weather and spray protection it is advisable to provide a permanently attached support plate 96 at the longitudinal supports 44 in the area of the steering pedals, which would support the driver's feet.

Naturally, the construction details, especially the type of connections and attachments of the frame components, can be executed in a manner different from that described here. With respect to the invention it would be of equal value, for example, if the rear ends of the diagonal struts 32 are inserted in suitable bores of a support 98 attached to the end pieces, where they are detachably secured by means of pins, or if, conversely, the support is permanently attached to the rear ends of the diagonal struts 32 and, during assembly, is detachably pinned together with the end pieces 58 of the crossbar 46, or otherwise suitably, detachably connected. The same applies accordingly to the other connecting points between the various components of the frame.

The sailing vehicle described here is also suited for two seats, to be placed side by side or behind one another (16), since it presents no difficulty to use longer profile sections, or possibly to use two additional, short longitudinal supports at the rear portion of the frame, which would be connected with the crossarm 46 and the two longitudinal supports 44 by means of additional traverse struts 48, 50. Finally, since it is easily possible to attach additional traverse struts 48 and to place these anywhere along the supports 44, the vehicle permits manifold alterations and variations of the sail, as well as the attachment of other desired equipment of a special nature.

In the sailing vehicle described above, the wheels 18, 20 can, according to FIG. 7 and 8, be replaced optionally by floating bodies 18', 20', or by skids 18", 20". Furthermore, instead of the skids shown in FIG. 8 (18", 20"), which are used for ice, ski-type glide boards for snow can be attached in the same manner. Since the wheels, floating bodies, skids and glide boards have the same attachment dimensions, it is not difficult to make a simple and very quick change-over of, for example, from wheels to floating bodies. One gets in that case, for example, a sailing vehicle for moving in the water, on which the keel-equipped front floating body is steerable. In the same manner as the front floating body 18', the two rear floating bodies 20' are also equipped with a keel, preferably relatively flat and wide in the manner of a surf board.

Figure 7:
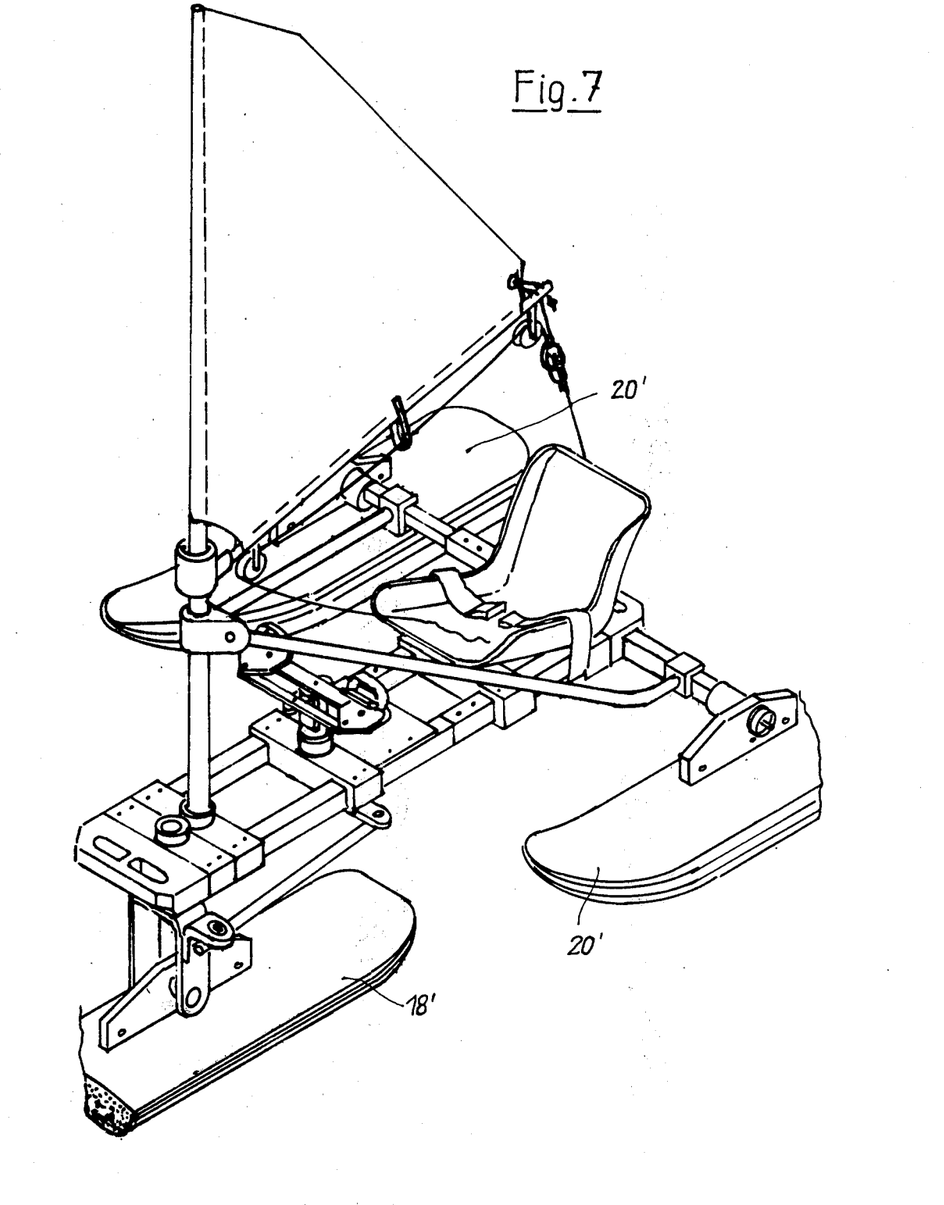
FIGS. 7 and 8—views according to FIG. 1 of the sailing vehicle with floating bodies or skids instead of the wheels.
Figure 8:
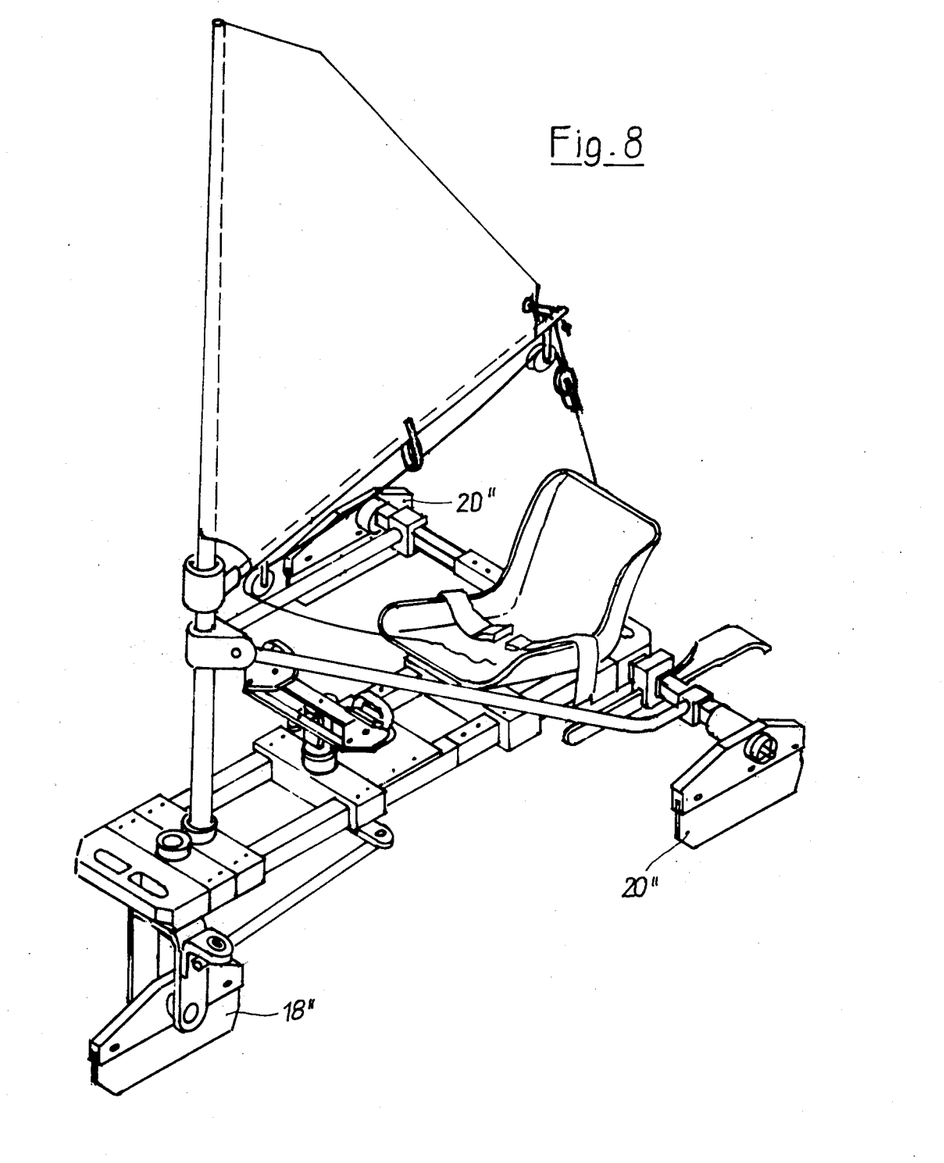

The floating bodies can consist either of a flexible, inflatable material, or of a naturally stiff and rigid hollow body; alternatively, as indicated in FIG. 7, they can contain aerated plastics.

A further feature of the new sailing vehicle is a so-called traveler 100, located at the rear of the vehicle and transversely movable, which is customary in sail boats. Such a traveler, on which the sail boom hangs by means of a rope connection, increases the range of the angle positions in which the sail boom can be maintained. In sail boats this traveler is freely accessible. On the other hand, in the sailing vehicle described in the application, the attachment of a traveler at first seemed to be impossible, since it seemed to be impossible for the driver to move the traveler behind his back.

To solve this problem (see FIG. 9), the traveler 100, which runs on a guide rail 102 connected to the cross-arm 46, was attached to a continuous rope 104. With the help of this rope, the driver can pull the traveler 100 to the left or right as desired, and he can arrest the traveler 100 in any desired position by clamping the rope 104. The rope 104, which is permanently attached to the traveler 100, runs left and right from the traveler through two eyes 106 located at the ends of the guide rail 102, and from there through two clamping devices 108, 110, which are next to one another and work together (see FIG. 10). According to FIG. 9, these clamping devices are mounted on a board 112, which is attached to the diagonal struts 32 in front of the driver's seat.

Figures 9, 10:
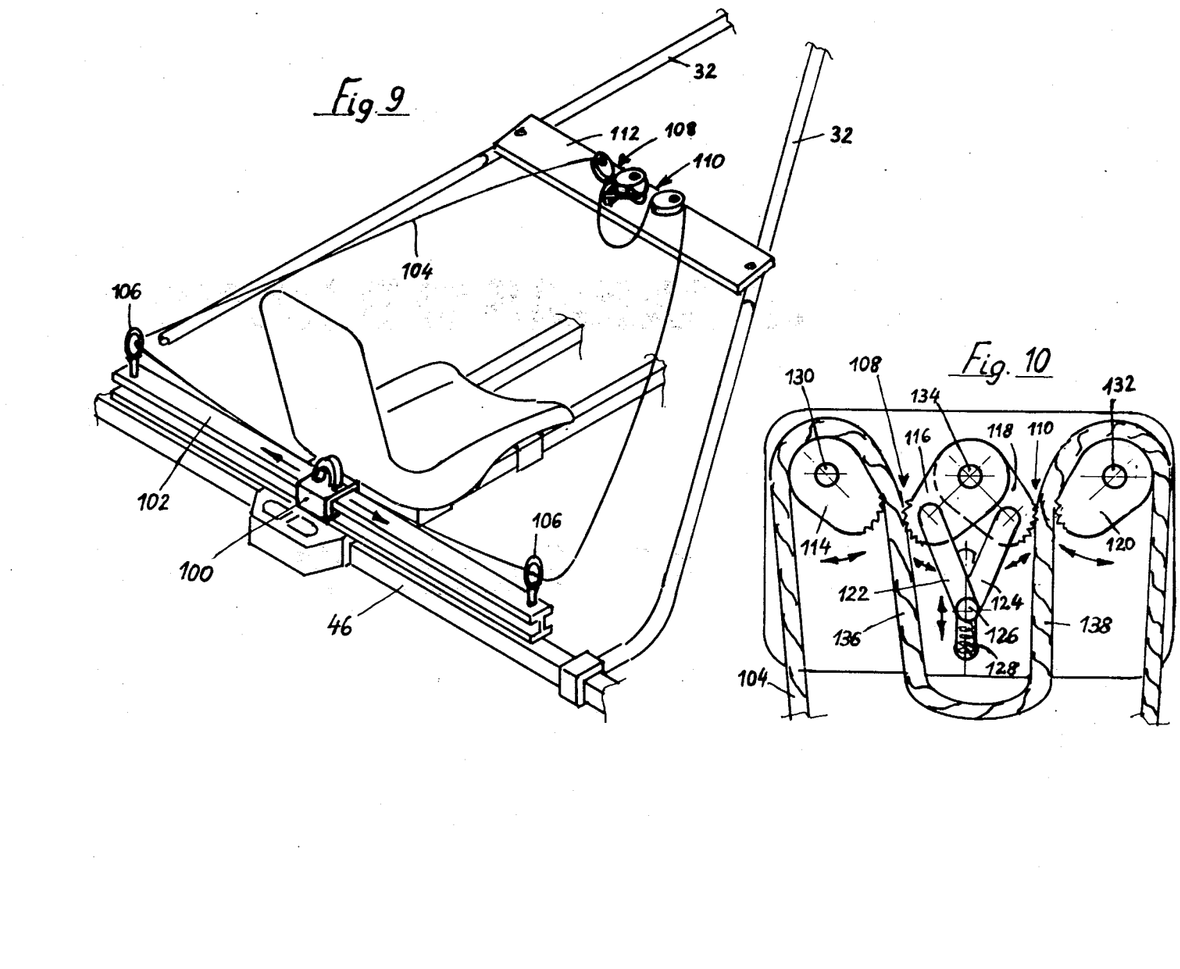
FIG. 9—a simplified perspective view of the rear section of the sailing vehicle with a traveler which is transversely movable.
FIG. 10—a plan view of a clamping device for a rope used to move the traveller according to FIG. 9.

Each of the two clamping devices 108 and 110 consists of two clamping cams 114, 116 and 118, 120, which work against each other and which, as shown in FIG. 10, can be roughened up or toothed on the portion of their circumference which clamps in the rope 104. The two clamping cams 116 and 118 are pivoted on guide rods 122 or 124, which, in turn, are hinged to each other at a hinge 126. A compression spring 128, supported at the board 112, which acts at the hinge 126 against the rods 122 and 124, tends to turn the clamping cam 116 against the clamping cam 114, while simultaneously deviating the clamping cam 118 toward the clamping cam 120. Since the rope 104 is located between the afore-mentioned clamping cams, the clamping cam 114 executes a turning motion in the opposite direction with respect to clamping cam 116. This applies correspondingly to the clamping cams 118 and 120.

While the clamping cams 114 and 120 are pivoted on their own axis of rotation 130 or 132, the two turning cams 116 and 118 are pivoted on a common axis 134.

To adjust the traveler 100, the driver grasps the rope 104 in the area between the two clamping devices 108 and 110. If he wants to pull the traveler 100 to the left (see FIG. 9), he grasps the rope in the area indicated as 136 and pulls it towards him. This loosens the clamping device 108. Since the clamping cams 116 and 118 are connected via the rods 122 and 124, the clamping device 110 is loosened simultaneously, so that the traveler can be pulled to the left by the rope 104. As soon as the driver stops pulling at the rope 104, the two clamping devices 108 and 110 return to their clamping position, so that the traveler is again arrested. If it is to be moved to the right, the driver pulls at the rope 104 in the area designated as 138.

I claim:

1. A sailing vehicle with a collapsible frame comprising several supports and struts and having at least one sail mast, at least one seat, two rear moving elements and one forward moving element, the latter being steerable via a steering suspension, characterized in that the frame (10) consists of two longitudinal supports (44) which are collapsible at their center section, a cross arm (46) which is detachably connected to the rear end of the longitudinal supports, a plurality of identically constructed transverse struts detachably connected to the longitudinal supports to unify the frame, the mast (12), the seat (16), the forward moving element (18', 18''), and the steering suspension (24, 62, 64, 86) being supported by separate ones of the transverse struts (48) with at least the transverse strut supporting the seat being connected to the longitudinal supports for adjustment lengthwise thereof.

2. A vehicle according to claim 1, characterized by the fact that the moving elements comprise one of wheels (18, 20) and skids (18'', 20'').

3. Vehicle according to claim 1, characterized by the fact that the cross arm consists of one center piece (46) and two outer end-pieces (58), which are connected by pin means (59).

4. A vehicle according to claim 1, characterized by the fact that the traverse struts (48) carrying the forward moving element (18, 18', 18''), the mast (12), the steering suspension (24, 62, 64, 86) and the seat (16) are constructed with identical lateral through-bores, which correspond to the outer cross-section of the longitudinal supports (44) and, vertically to these through-bores, with a central through-bore (54).

5. A vehicle according to claim 1, characterized in that the longitudinal supports are of hollow-section and in that the vehicle further includes forward and rear traverse struts (50) which are essentially identically constructed with pins (49) that interlock with the hollow-section longitudinal supports (44).

6. A vehicle according to claim 1, characterized by the fact that the forward half of the frame, by means of a cover (92) that encloses it and from which protrudes the forward moving element (18, 18', 18''), can be connected with the remaining parts of the vehicle and be moved in the manner of a wheelbarrow with a handle that is directly or indirectly connected to its rear (50).

7. A vehicle according to claim 1, characterized in that the vehicle further includes steering pedals (22) which are supported by a paralellogram-control (62, 64) which keeps the pedals transverse to the longitudinal direction of the frame (44, 46, 48, 50) independent of the steering position.

8. A vehicle according to claim 1, characterized in that the vehicle further includes steering pedals (22) which are connected with a steering column (76) which is pivoted in one of the transverse struts (48), the steering column (76) being connected via a steering suspension (24, 86) located below the frame with a fork (26) for the forward moving element (18, 18', 18'') which is pivoted in the frame.

9. A vehicle according to claim 1, characterized by the fact that various types of moving elements (18, 18', 18''-20, 20', 20'') have the same connection dimensions and are mutually exchangeable.

* * * * *